(12) United States Patent
Quibriac et al.

(10) Patent No.: US 12,275,422 B2
(45) Date of Patent: Apr. 15, 2025

(54) ENERGY MANAGEMENT SYSTEM FOR A MOTOR VEHICLE AND METHOD FOR MANAGING ENERGY IN A MOTOR VEHICLE

(71) Applicant: Volvo Truck Corporation, Gothenburg (SE)

(72) Inventors: Yann Quibriac, Lyons (FR); Raphaël Ribero, Millery (FR)

(73) Assignee: Volvo Truck Corporation, Gothenburg (SE)

( * ) Notice: Subject to any disclaimer, the term of this patent is extended or adjusted under 35 U.S.C. 154(b) by 282 days.

(21) Appl. No.: 17/824,003

(22) Filed: May 25, 2022

(65) Prior Publication Data

US 2022/0388523 A1    Dec. 8, 2022

(30) Foreign Application Priority Data

Jun. 8, 2021  (EP) ..................................... 21178140

(51) Int. Cl.
*B60W 50/10* (2012.01)
*B60R 16/03* (2006.01)
(Continued)

(52) U.S. Cl.
CPC ............. *B60W 50/10* (2013.01); *B60R 16/03* (2013.01); *B60W 10/26* (2013.01); *B60W 40/08* (2013.01);
(Continued)

(58) Field of Classification Search
CPC ...... B60W 50/10; B60W 10/26; B60W 40/08; B60W 2300/12; B60W 2420/403;
(Continued)

(56) References Cited

U.S. PATENT DOCUMENTS

| 7,663,502 B2 * | 2/2010 | Breed ..................... G06V 20/00 340/7.29 |
| 10,275,959 B2 * | 4/2019 | Ricci ...................... G08B 21/18 |

FOREIGN PATENT DOCUMENTS

| DE | 102012202009 A1 | 8/2013 |
| DE | 102014209680 A1 | 11/2015 |

(Continued)

OTHER PUBLICATIONS

Machine Translation DE-102015226061-A1 (Year: 2017).*
Extended European Search Report for European Patent Application No. 21178140.6, mailed Nov. 30, 2021, 6 pages.

*Primary Examiner* — Jean Paul Cass
*Assistant Examiner* — Lidia Kwiatkowska
(74) *Attorney, Agent, or Firm* — Withrow & Terranova, PLLC

(57) ABSTRACT

The invention relates to an energy management system for a motor vehicle, comprising a monitoring device adapted to monitor a position and/or a movement of a driver inside the motor vehicle, a driver's intention determination device adapted to determine the intention of the driver to use predetermined energy consuming devices of the motor vehicle based on the monitored position and/or movement of the driver, and an activating/deactivating device adapted to activate, and respectively deactivate, specific energy consuming devices among the predetermined energy consuming devices of the motor vehicle based on the determined driver's intention.

13 Claims, 2 Drawing Sheets

(51) Int. Cl.
  *B60W 10/26* (2006.01)
  *B60W 40/08* (2012.01)
  *G06V 20/59* (2022.01)
  *G06V 40/10* (2022.01)
  *G06V 40/20* (2022.01)

(52) U.S. Cl.
  CPC ............ *G06V 20/593* (2022.01); *G06V 40/10* (2022.01); *G06V 40/20* (2022.01); *B60W 2300/12* (2013.01); *B60W 2420/403* (2013.01); *B60W 2510/244* (2013.01); *B60W 2540/227* (2020.02); *B60W 2710/305* (2013.01)

(58) Field of Classification Search
  CPC ..... B60W 2510/244; B60W 2540/227; B60W 2710/305; B60R 16/03; B60R 16/023; B60R 16/0236; G06V 20/593; G06V 40/10; G06V 40/20; G06Q 10/04; G06Q 10/06313; G06Q 10/0635; G06Q 50/26
  See application file for complete search history.

(56) References Cited

FOREIGN PATENT DOCUMENTS

DE 102015226061 A1 * 6/2017
DE 102017221621 A1   6/2019

* cited by examiner

ENERGY MANAGEMENT SYSTEM FOR A MOTOR VEHICLE AND METHOD FOR MANAGING ENERGY IN A MOTOR VEHICLE

RELATED APPLICATIONS

The present application claims priority to European Patent Application No. 21178140.6, filed on Jun. 8, 2021, and entitled "ENERGY MANAGEMENT SYSTEM FOR A MOTOR VEHICLE AND METHOD FOR MANAGING ENERGY IN A MOTOR VEHICLE," which is incorporated herein by reference in its entirety.

FIELD OF THE DISCLOSURE

The invention relates to an energy management system for a motor vehicle and to a method for managing energy in a motor vehicle.

The invention can be applied in heavy-duty vehicles, such as trucks, buses and construction equipment. Although the invention will be described with respect to a truck and to a bus, the invention is not restricted to this particular vehicle, but may also be used in other vehicles such as construction equipment and passenger cars.

BACKGROUND

Modern vehicles are equipped with numerous electrically controllable components, including everything from small electrical motors for operating windows, windscreen wipers and doors; actuators used in relation to the engine of the vehicle or for controlling elements of a brake system; light sources for interior and/or exterior lighting; and similar. Typically, such electrically controllable components are activated/deactivated by a user (typically the driver) by operating an electrical switch, or automatically as a result of a determination made by an Electronic Control Unit (ECU) comprised inside the vehicle based on, for example, data received from monitoring sensors on-board the vehicle.

During the activation/deactivation of the electrically controllable components, the ECU usually checks that the energy consumed by the electrically controllable components does not exceed the power delivered by the battery. Indeed, activating all components simultaneously would involve a too high current consumption resulting in battery issues, which may lead to a random operation of the components. Another option could be to turn off all the systems and wake them up according to driver request but this would involve a too large wake up time, noticeable by the driver.

In order to avoid the above mentioned problem, solutions have been developed in the prior art to enable to fully power only electronic/electric infrastructure elements that are required at the concerned time, thus reducing the overall power consumption of the vehicle.

In a specific solution, the ECU is adapted to receive information about the currently required vehicle activity, whereby the required vehicle activity is defined by global vehicle modes, such as parking, living, or running, or by predefined needs of applications. Depending on the vehicle modes, the ECU may activate only the components that are needed for operating the vehicle in the specific vehicle mode and deactivate the other components of the vehicle.

However, in this solution, the ECU's power consumptions levels and so on vehicles functions availabilities are only based on the complete vehicle usage. This involves a non-optimized compromise between system energy consumption and functions availabilities for the driver and a strong and fixed dependency to the vehicle instant usage. The driver may therefore experience some limitations in some systems/functions availabilities because the vehicle is not into the correct vehicle usage to have them available.

SUMMARY

An object of the invention is to provide an energy management system for a motor vehicle, which avoids the problems of the prior art, especially a system that optimizes the compromise between system energy consumption and functions availabilities for the driver.

The object is achieved by an energy management system.

The "specific energy consuming devices" to which it is referred to in the claims remain power supplied and are kept in a mode where they can be operated immediately upon driver request.

Preferably, the driver's intention determination unit and the control unit to which it is referred to in the claims are one and the same unit, in particular an Electronic Control Unit (ECU) with which the vehicle is equipped. Nevertheless, in variant, it could be two different ECUs.

Advantageously, the "motor vehicle" to which it is referred to is a heavy-duty vehicle, typically a bus or a truck.

In the example, the "energy consuming devices" to which it is referred to are electrical devices/components, therefore consuming electrical energy. Nevertheless, in variant, the invention obviously applies to any energy consuming device, such as devices operating with compressed air or hydraulic energy.

For instance, the trucks and buses are usually provided with pneumatic actuators to enable the driver to control the suspension of the seat and, accordingly, move up and down the seat.

Obviously, the invention is also applicable to a motor vehicle provided with said energy management system.

The same object is also achieved by a method.

Typically, said method can be implemented by the energy management system to which it is referred to above.

Thus configured, the system and the method of the invention allow to determine the specific functions that the driver may need or is most likely about to use based on his location and/or movement in the vehicle and to only enable the use of these specific functions by turning off the other available functions of the vehicle. This allows reducing the risk of having the driver in a situation in which the driver cannot use certain functions due to a lack of sufficient energy. Furthermore, this allows to reduce the overall power consumption of the vehicle relative to the prior solution based on the vehicle usages.

Further advantages and advantageous features of the invention are disclosed in the following description.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

The present disclosure will now be described more fully hereinafter with reference to the accompanying drawings, in which currently preferred embodiment of the present disclosure are shown. This disclosure may, however, be embodied in many different forms and should not be construed as limited to the embodiment set forth herein; rather, this embodiment is provided for thoroughness and completeness, and fully convey the scope of the disclosure to the skilled addressee.

Figure 1A:
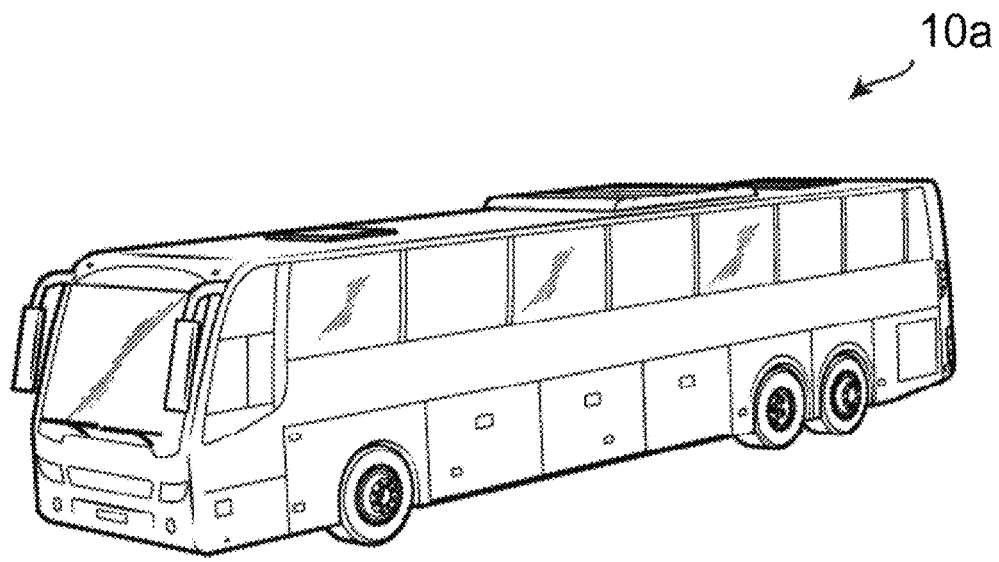
FIGS. 1A and 1B respectively illustrates a bus and a truck in which an energy management system according to the present disclosure may be incorporated.
Figure 1B:
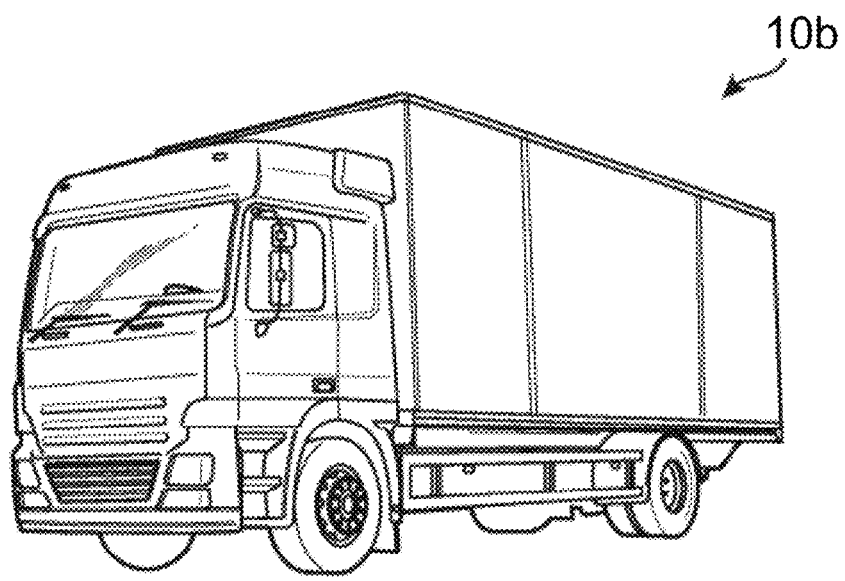
Figure 2:
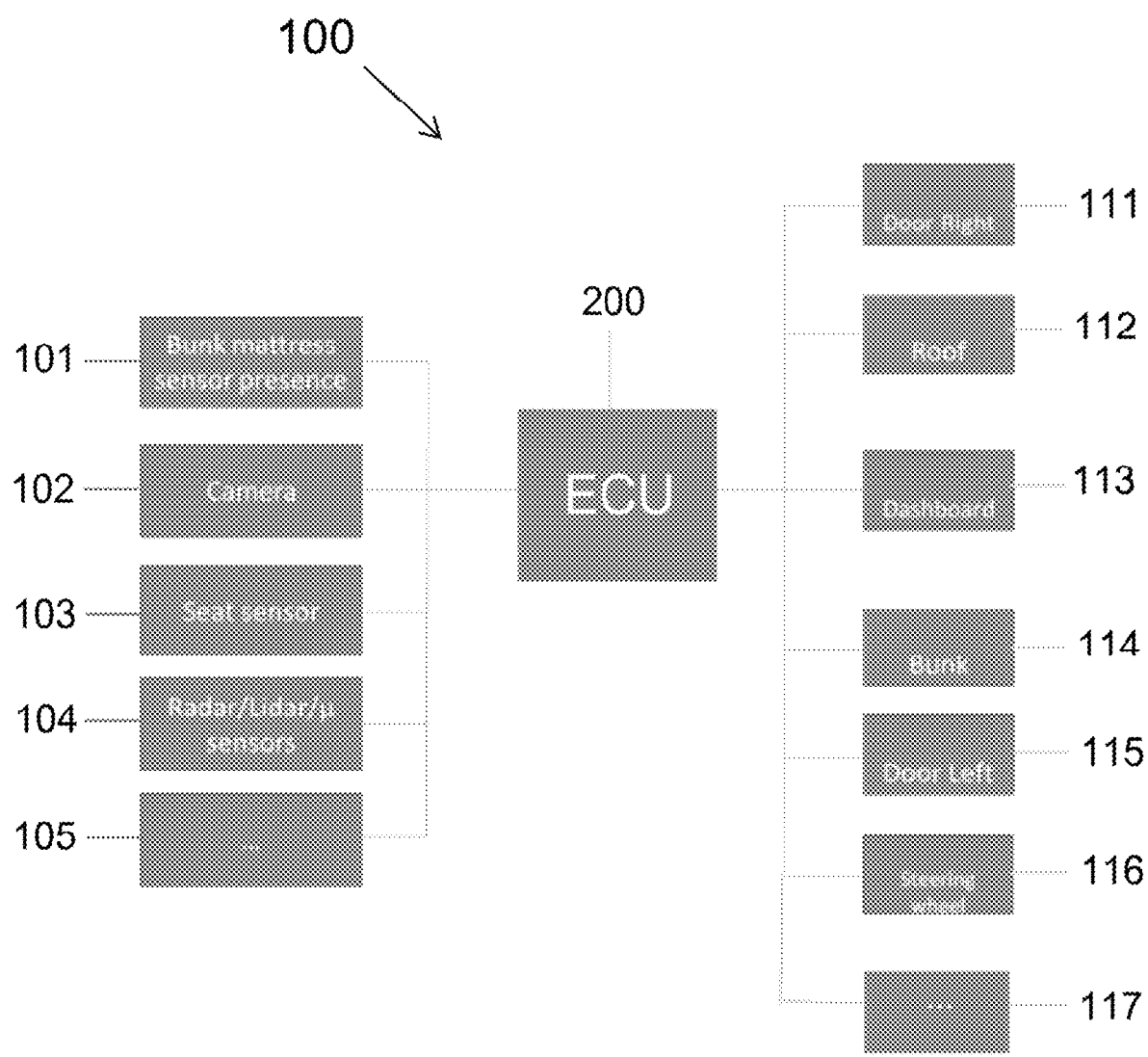
FIG. 2 is a diagram illustrating an energy management system according to an embodiment of the present invention.

Referring now to the drawings and to FIGS. 1A, 1B and 2 in particular, there is in FIG. 1A depicted an exemplary vehicle, here illustrated as a bus 10a, in which an energy management system 100 according to the present disclosure may be incorporated. The system 100 may of course be implemented, possibly in a slightly different way, in a truck 10b as shown in FIG. 1B, a car, etc. The vehicle may for example be one of a Battery Electric Vehicle (BEV) or Hybrid Electric Vehicle (HEV), or possibly a gas/gasoline/diesel vehicle. The vehicle comprises an electric machine (in case of being an electric or hybrid vehicle) or an engine (such as an internal combustion engine in case of being a gas/gasoline/diesel vehicle).

With further reference to FIG. 2, the system 100 comprises an Electronic Control Unit (ECU) 200 electrically connected via a plurality of connecting lines to corresponding sensors 101-105.

The ECU 200 is also connected via a plurality of control lines to corresponding electrically controllable vehicle components 111-117.

The ECU 200 can therefore be considered as a device for activating and deactivating any one of the electrically components 111-117. In other words, the ECU 200 controls the activation of said components 111-117. ECU 200 also controls power consumption of said components 111-117.

The sensors 101-105 are adapted to sense the position and/or the movement of the driver inside the cab of the vehicle. The sensors may for example include a sensor 101 for sensing whether a pressure/weight is applied on a mattress of a bunk installed at the rear of the cab of a truck. Another sensor 102 may consist in a camera mounted inside the cab of the truck, the field of vision of said camera would be oriented to the opposite of the road (rearwards). Another sensor 103 may be adapted to sense whether a pressure/weight is applied on a seat of the truck, e.g. driver's seat. Other sensors 104 may consist in radar or lidar sensors mounted inside the cab of the truck. Other sensors 105 may be further provided for sensing other data relative to the location and/or movement of the driver in the cab.

The electrically controllable vehicle components (also known as "devices") may for example include an actuator 111 adapted to move up and down the windows, an actuator 112 adapted to switch on or off the roof's light, an actuator 113 to switch on or off a light symbol on the dashboard, an actuator 114 adapted to switch on or off a light above the bunk, an actuator 115 adapted to move up and down the window of the left door, an actuator 116 adapted to lock or unlock the steering wheel, and further actuators 117 adapted to operate further equipment of the vehicle, like an air bag.

Based on the signals received from the sensors 101-105, the ECU 200 may determine the intention of the driver to use specific components among the electrically controllable vehicle components 111-117.

After the determination of the driver's intention, the ECU 200 activates the specific energy consuming components/devices that the driver may need in a close future and deactivate the other components. The activating step may consist in providing electrical power to the needed components to a normal level that allows using the components by the driver and the deactivating step may consist in reducing the electrical power provided to the unneeded components to a low level that does not enable using said components by the driver. Thus, the system 100 allows to reduce the overall power consumption of the vehicle by reducing the energy consumed by the components other than (or excluded from) the specific energy consuming devices.

For example, the "low level" to which it is referred to above can also be known as a "sleep mode" in which the concerned component(s) remain supplied with the minimum of electric energy but need to be waken up before activated.

In variant, the "low level" can also be a zero level, meaning that concerned components are completely switched off and do not consume any electrical energy.

Several examples are provided below to better illustrate the method for managing energy of the present invention.

In these examples, the motor vehicle is a truck and the driver has the possibility to choose different positions inside the cab of the truck, depending on the vehicle situation, e.g. running, parking, living, autonomous driving.

In a first possible scenario, when the truck is in a living situation and the driver is positioned in a bunk area of the cab, the sensor 101 sends a signal to the ECU 200 informing of the presence of the driver in the bunk area. This signal indicates to the ECU 200 that the driver intends to use the component 114 (e.g. bunk screen). Therefore, the actuators 111, 112, 113, 115 and 117 do not need to be available. The ECU 200 thus transfers these actuators into a low consumption state whereas the actuator 114 for the bunk is transferred into a normal consumption state.

In a second possible scenario, when the truck is in an autonomous driving situation and the driver is sitting in his normal driving position, the sensor 103 sends a signal to the ECU 200 informing of the presence of the driver in the driver's seat. This signal indicates to the ECU 200 that the driver intends to use the components 113, 115, 116 and 117 (e.g. infotainment, HVAC or phone services). Therefore, the actuators 111, 112 and 114 (e.g. CMS screens) do not need to be available. The ECU 200 thus transfers these actuators into a low consumption state whereas the actuator 113, 115, 116 and 117 are transferred into a normal consumption state.

In a third possible scenario, when the truck is in a living situation and the driver is sitting on the passenger side, the sensor 103 sends a signal to the ECU 200 informing of the presence of the driver in the passenger's seat. This signal indicates to the ECU 200 that the driver intends to use the components 111 and 113 (e.g. USB plug or passenger screen). Therefore, the actuators 112 and 114 to 117 do not need to be available. The ECU 200 thus transfers these actuators into a low consumption state whereas the actuator 111 and 113 are transferred into a normal consumption state.

It is to be understood that the present invention is not limited to the embodiments described above and illustrated in the drawings; rather, the skilled person will recognize that many changes and modifications may be made within the scope of the appended claims.

The invention claimed is:

1. An energy management system for a motor vehicle, comprising:
   an Electronic Control Unit (ECU) comprising a driver's intention determination circuit and a control circuit;
   a monitoring device adapted to monitor a position and/or a movement of a driver inside the motor vehicle;

the driver's intention determination circuit adapted to determine the intention of the driver to use specific energy consuming device(s) of the motor vehicle based on the monitored position and/or movement of the driver; and the control circuit adapted to reduce the consumption of energy consuming devices other than the specific energy consuming device(s) of the motor vehicle based on the determined driver's intention;

wherein the specific energy consuming device(s) are chosen among an actuator adapted to move up and down a window of a right door, an actuator adapted to switch on or off a roof's light, an actuator to switch on or off a light symbol on a dashboard, an actuator adapted to switch on or off a light above a bunk, an actuator adapted to move up and down a window of a left door, an actuator adapted to lock or unlock a steering wheel, and an actuator adapted to operate an air bag.

2. The system of claim 1, wherein the monitoring device is adapted to monitor the position of the driver inside the motor vehicle based on signals provided by at least one position sensor.

3. The system of claim 2, wherein the at least one position sensor is chosen among a bunk mattress sensor, a camera, a seat sensor, a radar sensor, and a lidar sensor.

4. The system of claim 1, wherein the monitoring device is adapted to monitor the movement of the driver inside the motor vehicle based on signals provided by at least one movement sensor.

5. The system of claim 4, wherein the at least one movement sensor is a camera.

6. The system of claim 1, wherein the control circuit is adapted to keep specific energy consuming devices power supplied.

7. A vehicle comprising the energy management system of claim 1, the vehicle being preferably a truck.

8. A method for managing energy in a motor vehicle, comprising the steps of:

monitoring a position and/or a movement of a driver inside the motor vehicle;

determining a driver's intention to use specific energy consuming devices of the motor vehicle based on the monitored position and/or movement of the driver; and reducing energy consumption of energy consuming devices other than the specific energy consuming devices of the motor vehicle based on the determined driver's intention;

wherein the specific energy consuming devices are chosen among an actuator adapted to move up and down a window of a right door, an actuator adapted to switch on or off a roof's light, an actuator to switch on or off a light symbol on a dashboard, an actuator adapted to switch on or off a light above a bunk, an actuator adapted to move up and down a window of a left door, an actuator adapted to lock or unlock a steering wheel, and an actuator adapted to operate an air bag.

9. The method of claim 8, wherein the monitoring comprises the monitoring of the position of the driver inside the motor vehicle based on signals provided by at least one position sensor.

10. The method of claim 9, wherein the at least one position sensor is chosen among a bunk mattress sensor, a camera, a seat sensor, a radar sensor, and a lidar sensor.

11. The method of claim 8, wherein the monitoring comprises the monitoring of the movement of the driver inside the motor vehicle based on signals provided by at least one movement sensor.

12. The method of claim 8, wherein the energy consumed by devices other than the specific energy consuming devices is reduced to a minimum level ("sleep mode") or to zero (deactivated).

13. The method of claim 12, whereby any energy consuming device other than ones included in the specific energy consuming devices is switched to a sleep mode where it consumes a minimum level of energy.

* * * * *